United States Patent [19]
Grisval

[11] Patent Number: 5,765,896
[45] Date of Patent: Jun. 16, 1998

[54] SPRING BIASED OUTER BEARING BRACKET FOR MOTOR VEHICLE SUN VISOR SHAFT

[75] Inventor: Benoit Grisval, Bains les Bains, France

[73] Assignee: Becker Group Europe GmbH, Wuppertal, Germany

[21] Appl. No.: 557,314

[22] Filed: Nov. 14, 1995

[30] Foreign Application Priority Data

Nov. 26, 1994 [DE] Germany ............... 44 42 133.8

[51] Int. Cl.$^6$ ............................................. B60J 3/02
[52] U.S. Cl. ............................... 296/97.9; 296/97.13
[58] Field of Search ..................... 296/97.9, 97.13, 296/97.1; 248/74.2

[56] References Cited

FOREIGN PATENT DOCUMENTS

| | | |
|---|---|---|
| 4302919 | 5/1954 | Germany. |
| 7717139 | 5/1977 | Germany. |
| 2803731 | 8/1979 | Germany. |
| 0005146 | 11/1979 | Germany. |
| 35 23 135 C1 | 10/1986 | Germany. |
| 4028939 | 6/1992 | Germany. |

OTHER PUBLICATIONS

European Search Report—Filed 15 Mar. 1996.

*Primary Examiner*—Sherman Basinger
*Attorney, Agent, or Firm*—Brinks Hofer Gilson & Lione

[57] ABSTRACT

An outer support bracket for the shaft of a motor vehicle sun visor including a base fastenable to the vehicle body and a supplementary body hingedly connected to the base at an integral hinge. A respective clamping arm for the bearing shaft defined on each of the base and the supplementary body. A screw fastens the base to the vehicle. A tubular extension on the supplementary body extends into an insertion opening in the base defining the extent to which the first and second arms can move together. A pin upstanding in the insertion opening in the base body receives the fastening screw. A compression spring between the head of the screw and a stop on the tubular extension on the supplemental body biases the supplemental body into the opening in the base.

8 Claims, 3 Drawing Sheets

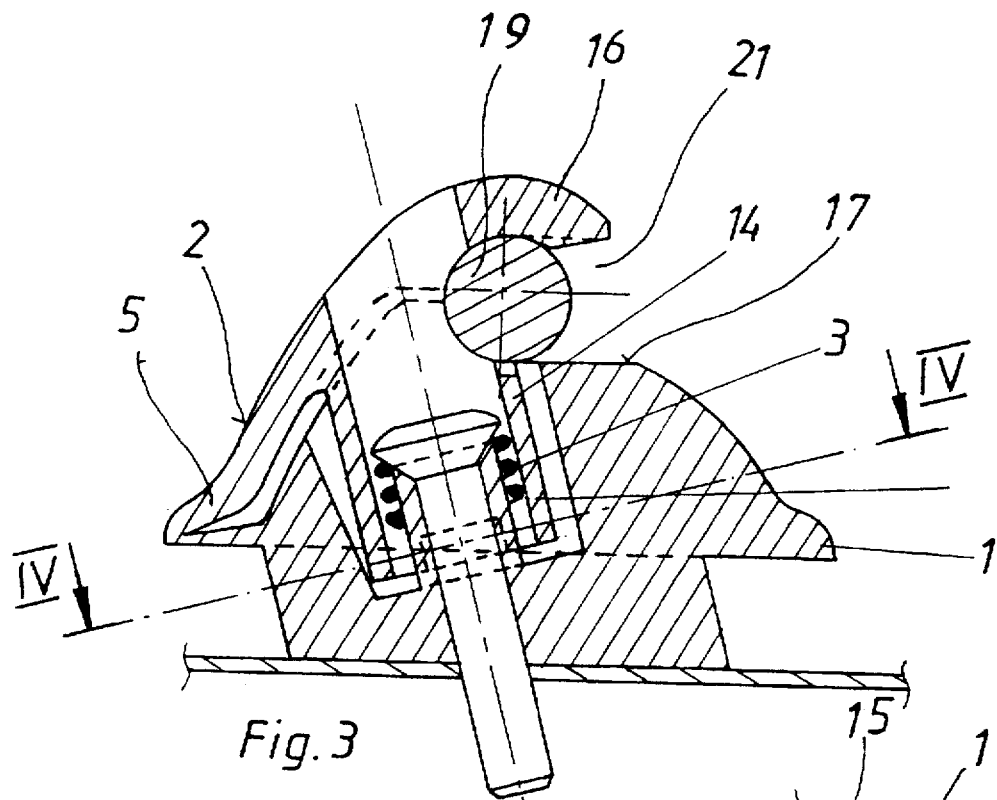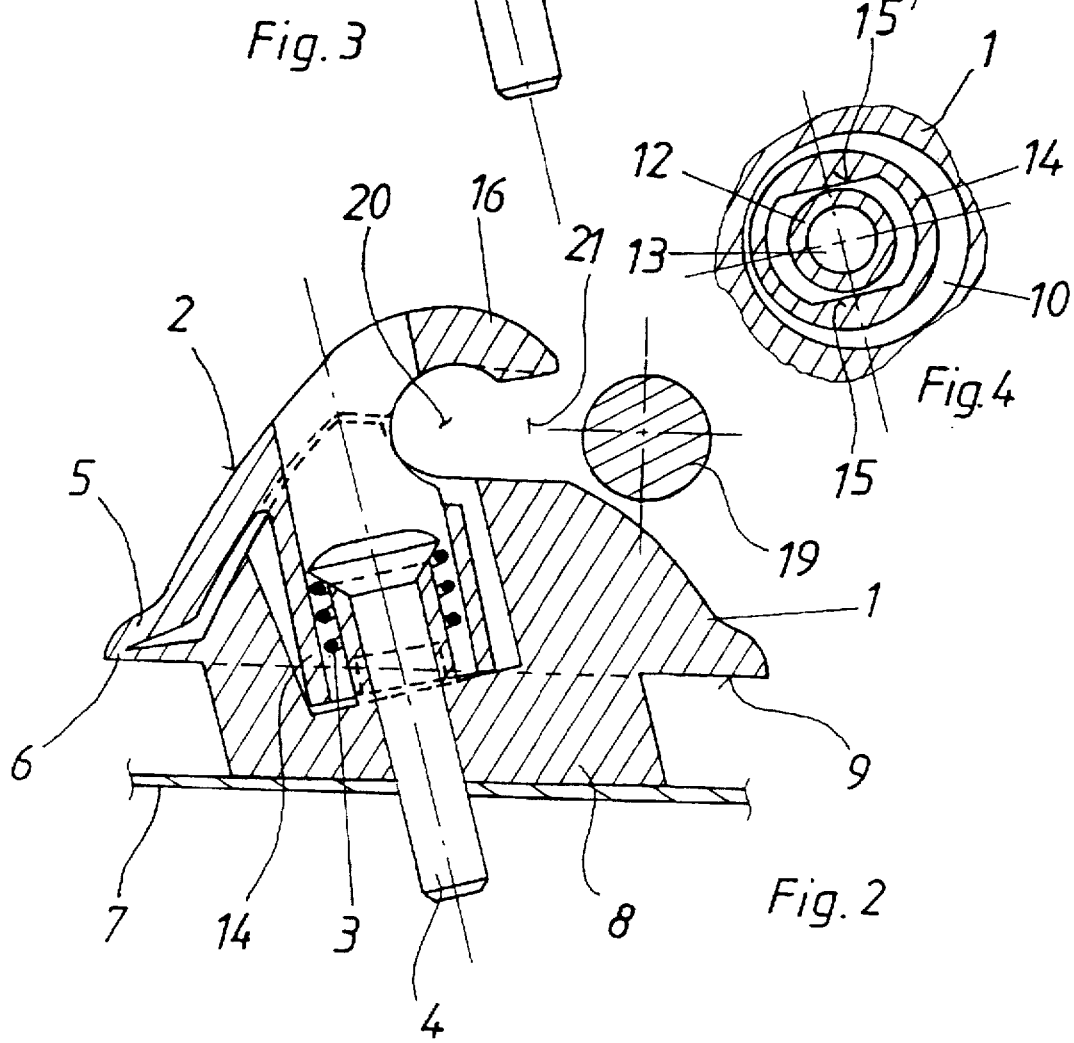

SPRING BIASED OUTER BEARING BRACKET FOR MOTOR VEHICLE SUN VISOR SHAFT

BACKGROUND OF THE INVENTION

The present invention relates to an outer bearing bracket for motor vehicle sun visors which has two arms which surround a sun visor shaft in a clamp-like manner. The facing ends of the arms form an undercut bearing opening for the sun visor shaft. An insertion slot permits repeated insertion of the shaft into the bearing opening.

Outer bearing brackets are used for sun visors of the type which are mounted so that they can be swung down in front of the windshield of the motor vehicle or swung via a swivel bearing towards the side window. The brackets are generally referred to as outer supports or brackets, since they support the sun visor shaft toward the region of its end which is remote from the swivel bearing when the sun visor body is in front of the windshield. Known outer bearing brackets of this type are relatively rigid (see the papers of Federal Republic of Germany Utility Model 77 17 139), and they have the disadvantage that they do not operate properly at low temperatures, when the sun visor shaft can be pulled out of the bearing opening only with a large force, if at all. If the mounting shaft is pulled out with a relatively large force, there is the danger that the foil layer with which the sun visor mounting shaft is generally covered in the region of the outer support bracket will be damaged. On the other hand, it has been found that known bearing brackets have only slight stability in the presence of a relatively high temperature, e.g. after the vehicle has been sitting in the summer sun.

To avoid these difficulties, in an outer bearing bracket of the type known from Federal Republic of Germany 28 03 73 C2, the arm adjacent the plane of application of force to the mounting shaft has at least one spring tongue which can be swung with spring elasticity in the direction toward the plane of application. Although this bearing bracket has proven excellent in actual use, there is a need for improvement, in particular with respect to the holding force of its arms in case of its exposure to particularly high temperatures.

Federal Republic of Germany 43 02 919 C1 discloses a bearing bracket for motor vehicle sun visors which has a bearing body which can be fastened to a surface of the body of the vehicle. An insertion slot for receiving the outer support shaft is developed between an arm on the bearing body and the bearing body itself. A locking element for the outer support shaft is swingably mounted between a locking position and an unlocking position around a shaft which is spaced from the insertion slot. There is a locking projection on the locking element which closes the insertion slot at least partially in the locking position and which releases the outer support shaft in the unlocked position.

SUMMARY OF THE INVENTION

It is an object of the present invention to create a bearing bracket of the aforementioned type which performs well, in particular also at either high or low ambient temperatures.

In the invention, the first arm of the bracket is developed on a base and the second arm of the bracket on a supplementary body which is connected to the base by a fastening element. A spring between the base and the supplementary body forms the bearing bracket.

The invention, and particularly its spring system, creates an outer support bracket for a motor vehicle sun visor which permits easy engagement and disengagement of the sun visor shaft, particularly at both low temperatures and high temperatures, and assures a holding force, against removal of the visor shaft or insertion of the visor shaft, which is always the same regardless of temperature, and which also compensates for manufacturing tolerances.

In a preferred embodiment of the invention, the base has an insertion opening for receiving the supplementary body. An erect pin extends up from the bottom of the insertion opening. The pin has a hole through it which also passes through the base. The supplementary body is developed with a tubular extension which grips around the pin and rests on the bottom of the insertion opening. A screw passes through the base and is screwed as a fastening element into the hole. The screw fastens the supplementary body to the base and also fastens the bearing bracket to the body of the vehicle.

The spring is developed as a helical compression spring. One end of the spring rests against stops on the inside of the tubular extension and the other end of the spring rests against the head of the screw. The spring is thereby arranged between the pin and the tubular extension. The base together with the supplementary body may be developed as a one piece plastic injection molding having a strap as a connecting member between them and including a film hinge in the strap as a swing joint between them.

Other features and advantages of the present invention will become apparent from the following description of the invention which refers to the accompanying drawings.

BRIEF DESCRIPTION OF THE DRAWINGS

One embodiment of the invention is explained below with reference to the drawings, in which:

FIG. 2 is a section along the line II—II of FIG. 1, with a sun visor shaft present in front of the bearing opening;

FIG. 3 is the same sectional view as in FIG. 2, but with the sun visor shaft located within the bearing opening;

FIG. 4 is a section approximately along the line IV—IV of FIG. 3; and

DETAILED DESCRIPTION OF THE INVENTION

Figure 1:
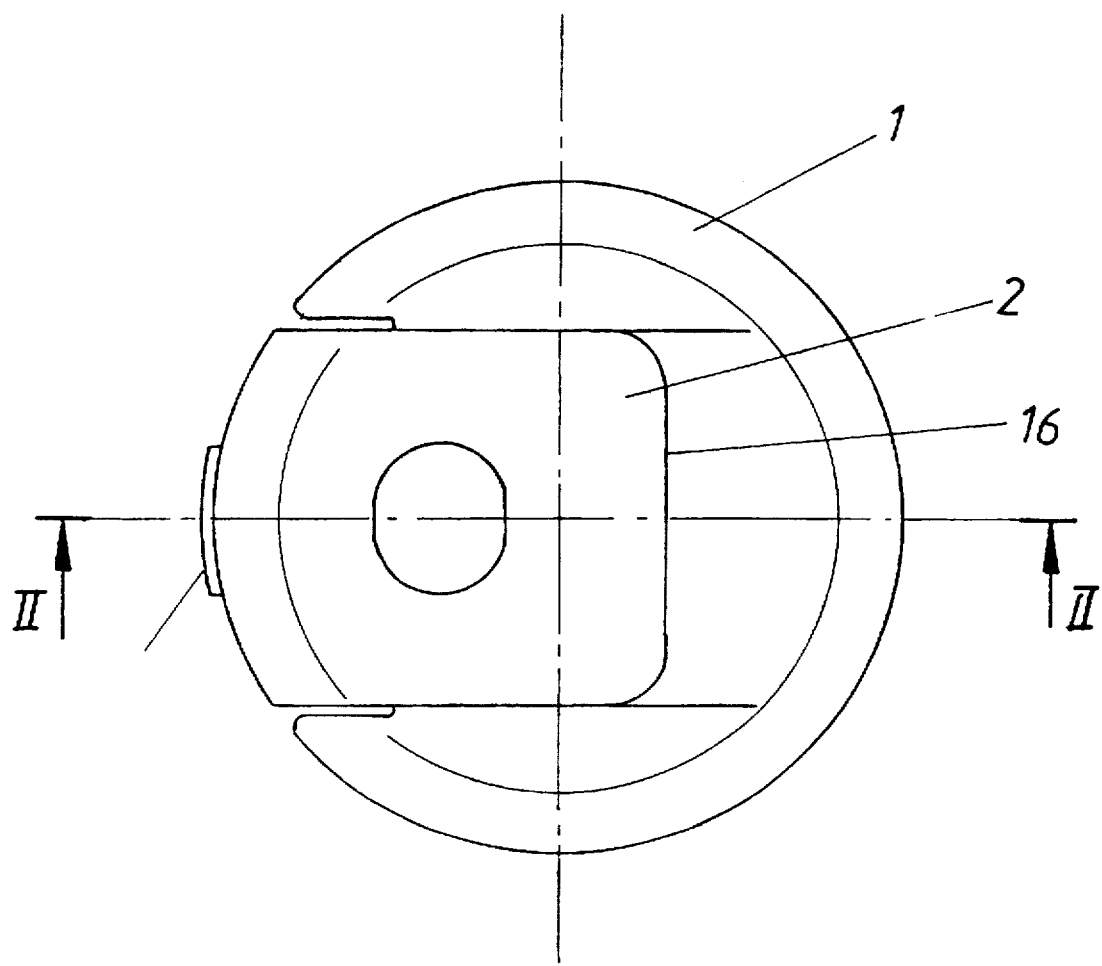
FIG. 1 is a top view of the bearing bracket.
Figure 5:
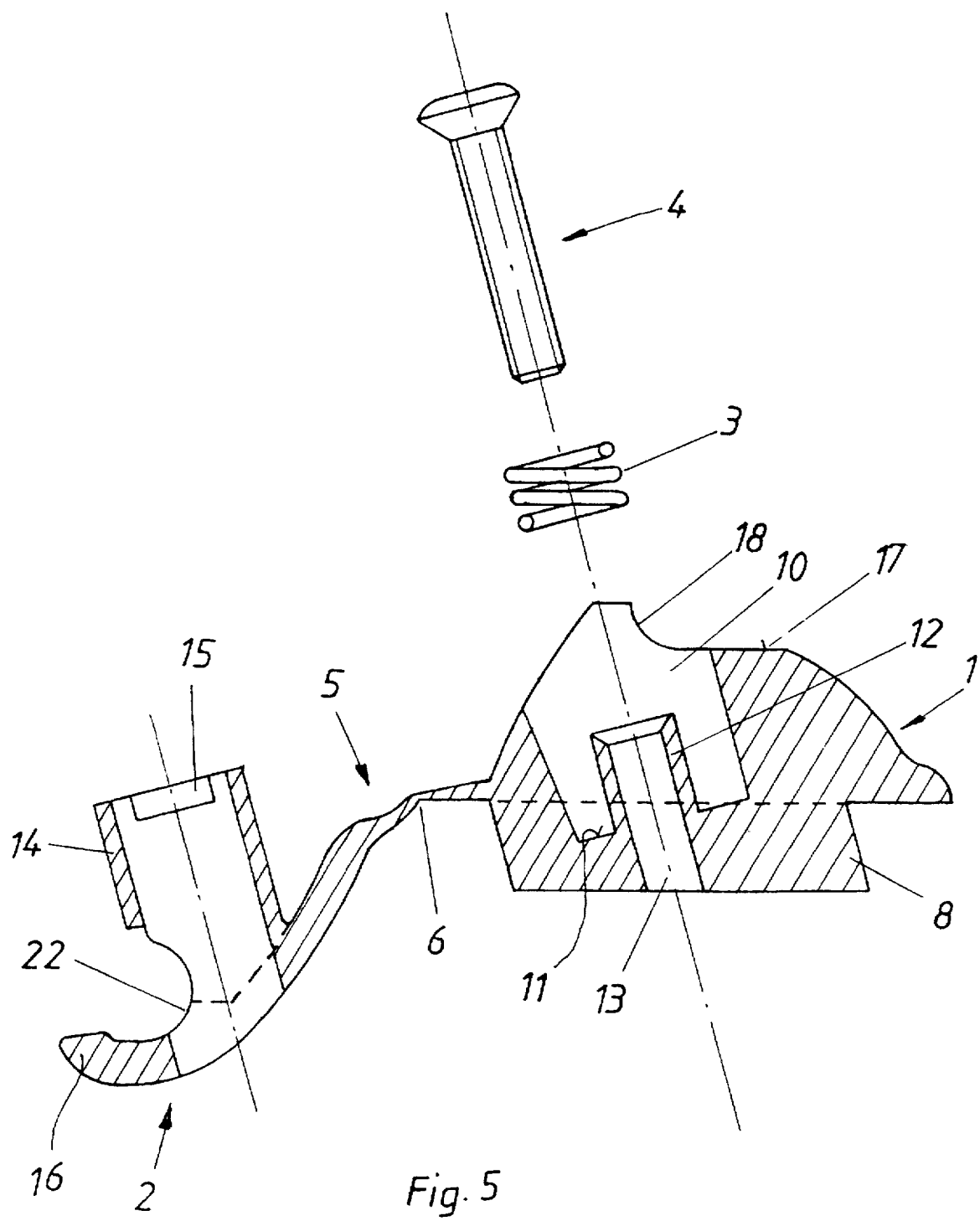
FIG. 5 is an exploded view of the bearing bracket before assembly.

The outer bearing bracket of the invention is comprised of a base or main body 1, a supplementary body 2 which is developed in one piece and integrated with the base, a spring 3, and a screw 4. An integral strap 5 serves as a connecting member between the base 1 and the supplementary body 2. A thinning in the material which extends transversely over the strap 5 forms a film hinge 6 as a swing joint, whereby it is possible to swing the supplementary body 2 and the strap 5 out of its starting position, shown in FIG. 5, into its position of use in accordance with FIGS. 1–4. The bearing bracket which is formed of the base 1 and the supplementary body 2 and the strap 5 consists of a single-piece plastic injection molding.

The base 1 includes a support pin 8 which rests on the body 7 of a motor vehicle. The support pin is set back with respect to the contour of the base. A circumferential flange 9 is formed which rests against a covering element (not shown), such as a ceiling lining. An insertion opening 10 extends from the side of the base 1 facing away from the support pin 8. It has a bottom 11. An upstanding pin 12 extends from the bottom 11 and is arranged approximately centrally. The pin 12 has a hole 13 which extends through the base 1 and its support pin 8.

The supplementary body 2 has a tubular extension 14 with an opening that passes through the supplementary body 2. Inside stops 15 are developed on the free end region of the extension 14. An arm 16 extends over the extension 14, at the end of the body 2 opposite the strap 5. After the swinging together of base 1 and the supplementary body 2 from the condition of FIG. 5 to that of FIG. 2, the arm 16 cooperates with a surface which forms a second arm 17 and passes into a throat 18 (FIGS. 2 and 3) so as to produce an insertion slot 21 which opens into an undercut bearing opening 20 for a sun visor shaft 19. The undercut bearing opening 20 is therefore formed by the throat 18 and by the hollow throat 22 in the transition region from the extension 14 to the arm 16.

The holding together of the two swung together parts, the base 1 and the supplementary body 2, is caused by the spring 3, which is a helical compression spring, and by the screw 4 which cuts a thread in the wall of the hole 13 and can furthermore be screwed into the body 7 of the motor vehicle. The spring 3 surrounds the pin 12 and rests at one end against the stops 15 and at the other end against the screw head. Upon insertion of the sun visor shaft 18 in the bearing opening 20, the arm 16 is permitted to move away as a result of the spring 3. This occurs in the same manner upon pulling out of the visor shaft. The force that needs to be applied against the spring 3 is always of the same amount, even in the event of considerable variations in ambient temperature, so that the new bearing bracket completely satisfies technical requirements, while being of simple and inexpensive manufacture.

It is self-evident that the opening in the supplementary body 2 which is necessary for the passage of the screw 4 and the spring 3 can be closed, if desired, by a cover, for instance in accordance with the teaching of EP 0 005 146 B1.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. An outer support bearing bracket for a motor vehicle sun visor comprising:

a base for attachment to a motor vehicle; a first clamp arm for clamping to a sun visor shaft and being formed on the base;

a supplementary body; a second clamp arm for cooperating with the first clamp arm for clamping to a sun visor shaft and being formed on the supplementary body;

a fastening element connecting the supplementary body to the base in a manner permitting relative movement between the base and the supplementary body;

the first and second arms being so positioned on the base and the supplementary body respectively as to include respective facing sides of the arms that face toward each other, and the respective facing sides form a bearing opening between them for receiving a sun visor shaft;

a spring between the base and the supplementary body for normally urging the supplementary body to move with respect to the base and the fastening element as to define the bearing opening for the sun visor shaft and to enable the first and second arms to move apart for receiving the sun visor shaft moving between the first and second arms into or out of the bearing opening and for urging the first and second arms together to hold the sun visor shaft in the bearing opening; and a screw fastening the supplementary body to the base and also fastening the bearing bracket to the body of the vehicle.

2. The bearing bracket of claim 1, wherein the supplementary body includes an extension extending into the base past part of the screw;

the spring being a compression spring biasing between the supplementary body extension extending past part of the screw and the part of the screw past which the extension extends such that the compression spring normally urges the supplementary body toward the base for biasing the first and second clamp arms toward each other.

3. The bearing bracket of claim 1, wherein the base has an insertion opening defined therein and which opens toward the supplementary body; the supplementary body includes an extension that extends into the opening in the base;

the spring extending between the screw and the extension of the supplementary body in the insertion opening of the base for urging the first and second clamp arms toward each other.

4. The bearing bracket of claim 3, wherein the spring is a compression spring.

5. The bearing bracket of claim 4, further comprising a tubular extension; wherein the spring is a helical compression spring with opposite ends; the tubular extension having a stop on the inside thereof on which one end of the compression spring rests, and the screw having a head outward of the insertion opening from the stop on the tubular extension, and the other end of the compression spring resting on the head of the screw.

6. The bearing bracket of claim 1, wherein the base has an insertion opening defined therein and which opens toward the supplementary body;

a pin formed in the opening of the base;

a hole through the pin and through the base;

the screw passing through the hole in the pin and the base;

a tubular extension defined on the supplementary body and positioned and shaped to extend into the insertion opening of the base and around the outsides of the pin of the base and the screw in the hole in the pin, the tubular extension being of a length to rest on a bottom of the insertion opening for defining the maximum extent to which the first and second clamp arms may move together;

the spring extending between a portion of the tubular extension toward the bottom of the insertion opening in the base and a portion of the screw in the hole which is further outward of the insertion opening, and the spring thereby urging the tubular extension toward the bottom of the hole in the insertion opening.

7. The bearing bracket of claim 6, wherein the base and the supplementary body are developed as a single piece plastic injection molding, the fastening element connecting the base and the supplementary body comprising a strap in the single piece molding, including a film hinge in the strap to serve as a swing joint between the base and supplementary body.

8. The bearing bracket of claim 1, wherein the base and the supplementary body are developed as a single piece plastic injection molding, the fastening element connecting the base and the supplementary body comprising a strap in the single piece molding, including a film hinge in the strap to serve as a swing joint between the base and supplementary body.

* * * * *